United States Patent [19]

Williams

[11] Patent Number: 5,056,295
[45] Date of Patent: Oct. 15, 1991

[54] CUTTER AND SEALER FOR FILM

[75] Inventor: Jerry L. Williams, Bon Air, Va.

[73] Assignee: Reynolds Metals Company, Richmond, Va.

[21] Appl. No.: 644,362

[22] Filed: Jan. 22, 1991

[51] Int. Cl.⁵ .......................... B65B 51/30; B65B 51/14
[52] U.S. Cl. ........................................ 53/450; 53/479; 53/550; 53/373.7; 156/530; 83/171; 83/640; 83/700
[58] Field of Search ................... 53/375.9, 373.7, 552, 53/450, 451, 477, 479, 550; 156/530, 518, 515, 251; 83/171, 640, 700

[56] References Cited

U.S. PATENT DOCUMENTS

| | | |
|---|---|---|
| 2,638,963 | 5/1953 | Frederick et al. |
| 2,999,532 | 9/1961 | Bursak ............................. 53/552 X |
| 3,050,916 | 8/1962 | Gausman et al. ..................... 53/552 |
| 3,083,757 | 4/1963 | Kraft et al. .......................... 156/515 |
| 3,233,494 | 2/1966 | Rupp ..................................... 83/640 |
| 4,102,111 | 7/1978 | Nack et al. ............................. 53/552 |
| 4,700,481 | 10/1987 | Barrett ............................. 83/700 X |
| 4,767,482 | 8/1988 | Diez et al. ....................... 156/515 X |
| 4,807,426 | 2/1989 | Smith .............................. 53/552 X |
| 4,872,942 | 10/1989 | Sharps, Jr. et al. ................ 156/515 |

*Primary Examiner*—Horace M. Culver
*Attorney, Agent, or Firm*—Alan T. McDonald

[57] ABSTRACT

System for cutting and sealing overlapped film for packaging objects by a blade projecting between heated bars, with means movable along slots in the blade to adjust the blade projection.

5 Claims, 3 Drawing Sheets

CUTTER AND SEALER FOR FILM

FIELD OF THE INVENTION

The field of the invention is cutting overlapped film and sealing together the adjacent cut edges of the film, for packaging purposes.

BACKGROUND OF THE INVENTION

For purposes of packaging a series of articles, it is customary commercial manufacturing practice to enclose the articles in a tube of plastic film with spaces between the articles and to pass this assembly through apparatus which clamps and cuts through the film between adjacent articles and seals together the cut edges on opposite sides of each cut. This is done by clamping means and a cutter blade secured between a pair of heated bars. The inner end of the space between the heater bars that holds the blade receives a heater element which extends parallel to the length of the blade. The film moves over a fixed cutting and sealing pad, is clamped there, and is cut when the blade moves against the film on the pad. The heater bars also move against the pad and seal the cut edges of the film resting on the pad on opposite sides of the blade.

If the articles to be packaged are no more than about 2 ½ to 3 inches high, it is conventional to have the blade project only a short distance, such as 0.013 to 0.016 inch, beyond the heater bars toward the cutter pad. In that case, it is conventional to use a cutting and sealing pad having a plain flat surface opposed to the blade, and made of a resilient and heat resistant material, such as silicone rubber or felt.

If the articles to be packaged have a greater height, it is conventional to use a blade having a greater projection from the heater bars, such as 0.06 to 0.07 inch, and a cutting and sealing pad having a slot to receive the blade. In that case, the pad material still needs to be heat resistant and resilient. In both cases, the knife blade is positively locked by engagement with screws extending through close fitting openings through the blade and heater bars. A blade having a different projection is conventionally substituted when shifting between packaging articles requiring a short blade projection and articles requiring a longer blade projection. This requires removing all the blade-holding screws and reinserting them to hold the substitute blade.

SUMMARY OF THE INVENTION

The object of the invention is to reduce time and expense of changing blades when blades of different projections are required in film packaging apparatus of the kind described.

In accordance with the invention, a single blade can be used for packaging purposes requiring a short blade projection beyond the heater elements, and also for packaging articles requiring a long blade projection beyond the heater elements. This is done by providing slots in the blade where the bolts go through that clamp it between the heater bars. The slots are elongated in a direction normal or at least transverse to the length of the cutting edge of the blade, so that when the clamping screws are loosened, the blade can be shifted between its short projection mounting and its long projection mounting. The frictional grip on the blade after tightening the screws is enough to lock it in place for further operation, without need for positive engagement of the blade against the screws.

Other objects, advantages and details of the invention will become apparent as the following disclosure proceeds.

DRAWINGS ILLUSTRATING PRESENT PREFERRED EMBODIMENT OF THE INVENTION

Referring now more particularly to the accompany drawings, in which there is shown, for purposes of illustration only:

Figure 2A:
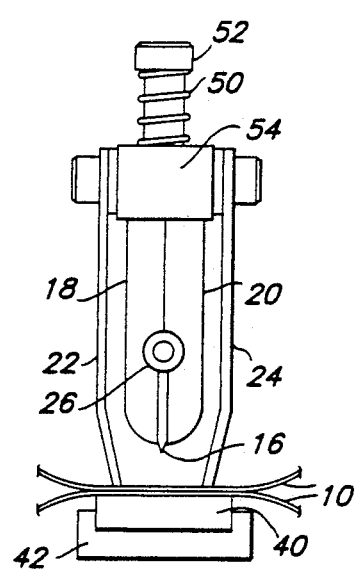
FIG. 2A shows an enlarged semi-diagrammatic end view of the cutter and sealer of FIG. 1, but in raised position and omitting the articles of FIG. 1.
Figure 3A:
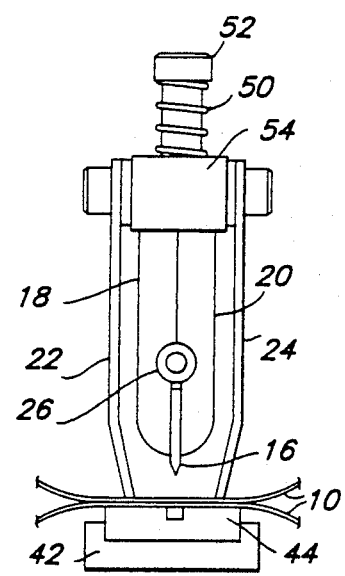
Figure 2B:
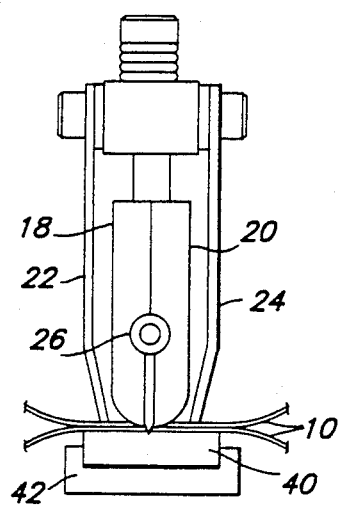
Figure 3B:
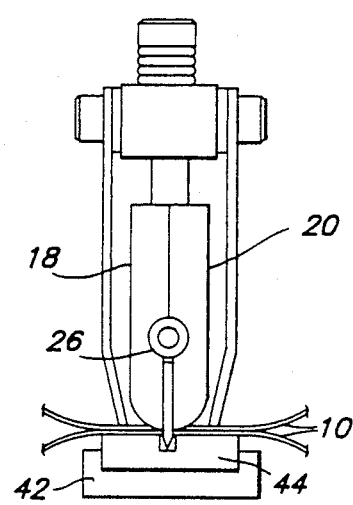

FIG. 2B corresponds to FIG. 2A, but shows the cutter and sealer moved down to cutting and sealing position;

FIG. 3A corresponds to FIG. 2A, but shows the cutter blade shifted to its more extended position, and a slotted pad substituted for the pad opposite to the cutter and sealer in FIG. 2A;

FIG. 3B corresponds to FIG. 3A, but shows the cutter and sealer moved down to cutting and sealing position.

Figure 4:
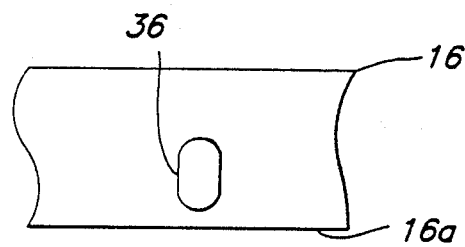
Figure 6:
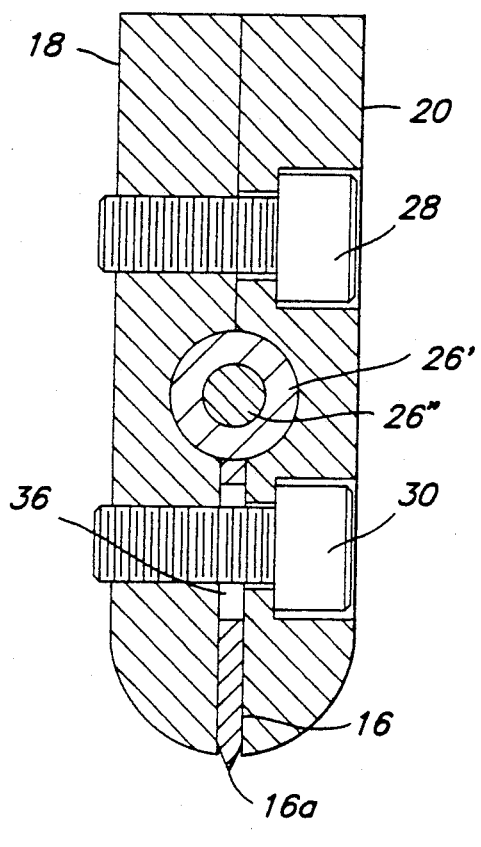
Figure 7:
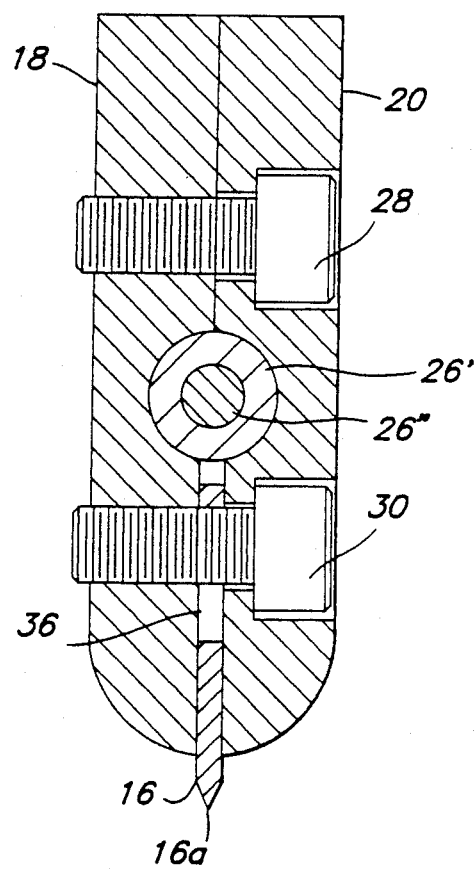
Figure 5:
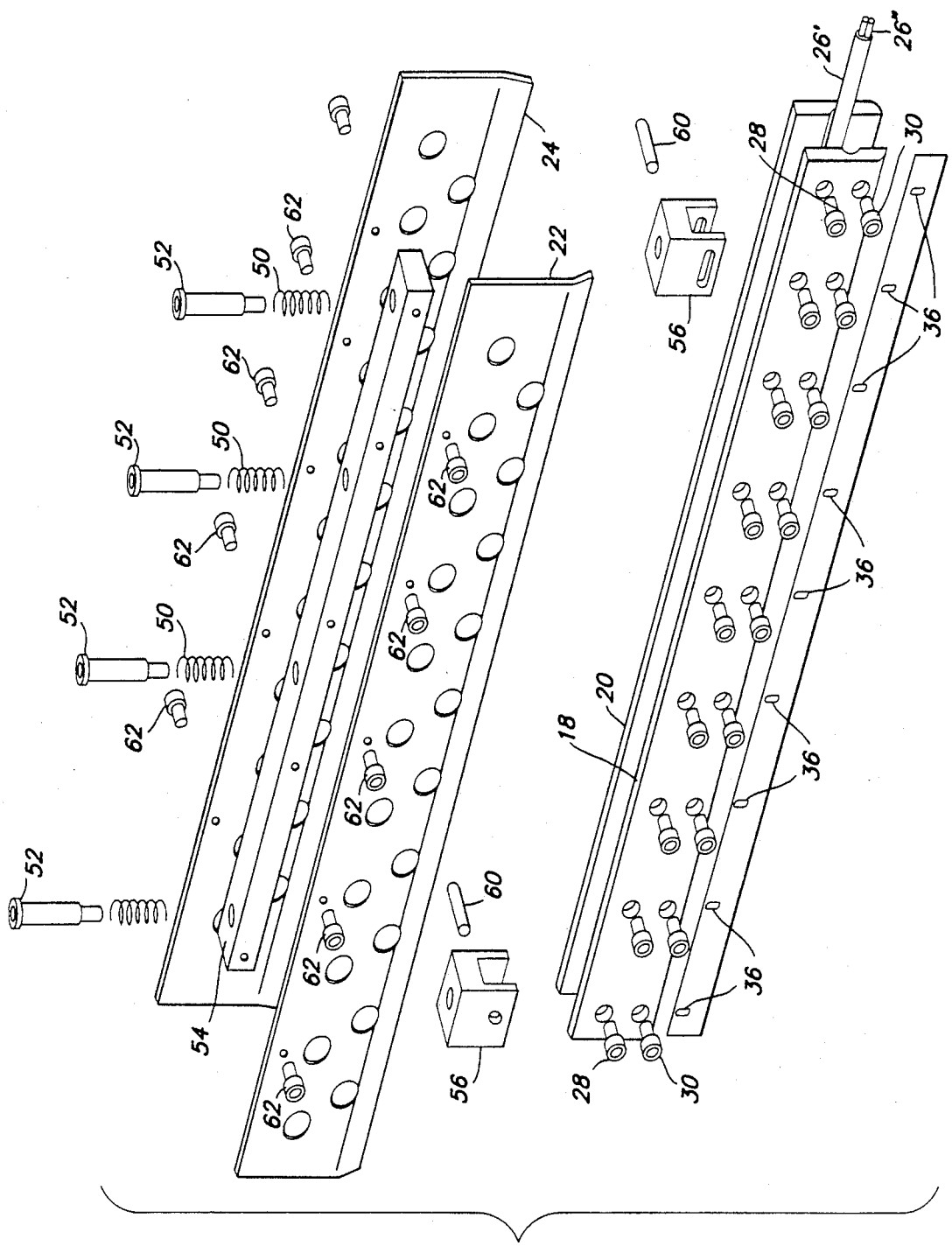

FIG. 4 shows a side view, further enlarged and broken away, of a slotted portion of the cutter blade shown in the preceding figures;

FIG. 5 shows an isometric exploded view, in reduced scale, of said blade and adjacent elements for clamping, cutting and sealing film;

FIG. 6 shows an enlarged semi-diagrammatic transverse sectional view through said blade at one of its slots, and through the screws holding the adjacent elements together to clamp against the blade, showing the blade in its less extended position; and FIG. 7 corresponds to FIG. 6, but showing the blade in its more extended position.

DESCRIPTION OF PRESENT PREFERRED EMBODIMENT OF THE INVENTION

Figure 1:
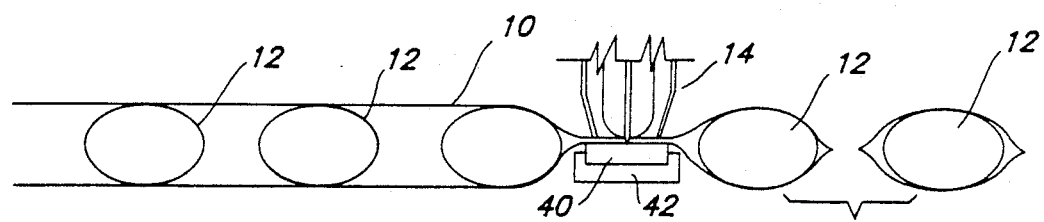
FIG. 1 shows a schematic side view of a succession of articles in a tube of plastic film being cut and sealed by apparatus embodying the invention (with the cutting blade in its less extended position)

Referring now more particularly to the accompanying drawings, and initially to FIG. 1, a tubular length of film 10 encloses spaced articles 12 to a cutting and sealing unit 14, where the film is cut transversely of its length between the successive articles 12. Each time the unit 14 operates it flattens and clamps the tubular film and applies heat to fuse the flattened film ends together on both sides of the cut. This forms a sealed bag around each of the articles 12 leaving the unit 14.

Unit 14 has a cutting blade 16 held between a pair of heater bars 18 and 20. A pair of film clamping plates 22 and 24 extend along and are spaced outwardly from the pair of bars 18 and 20. An elongated heater element 26 extends between the heater bars, which are in contact with each other above the heater element 26, and are recessed to provide a slot between them beneath heater element 26 to receive blade 16. The upper end of this slot opens into a wider space which receives heater element 26. The heater element 26 extends parallel to the cutting edge 16a of blade 16 and to its back edge, and comprises a hollow rigid cylindrical tube 26' and an electrical heating unit 26" extending within the tube.

The subassembly of blade 16, heater bars 18 and 20, and heater element 26 is held together by a series of successive pairs of upper and lower screws 28 and 30 spaced along the length of the assembly. Heater element 26 is between the upper row of screws 28 and the lower row of screws 30. The integral heads of bolts 28 and 30 engage heater bar 18, and their ends are screwed into heater bar 18. Openings 36 in blade 16 receive screws 30, and are in the form of slots extending normal to the cutting edge 16a of the blade, so that when the screws 30 (and perhaps also the screws 28) are loosened, blade 16 can be moved vertically from its position of minimum projection from between the heater bars 18 and 20, as shown in FIGS. 2A-B and 6, to its alternate position of greater projection, as shown in FIGS. 3A-B and 7. After blade 16 has been placed in its selected upper or lower position, the screws 30 (and screws 28, if previously loosened) are tightened to hold blade 16 in its selected position.

When blade 16 is in its retracted position, a cutting and sealing pad 40 is placed opposite to it, on a fixed support (FIGS. 2A-B). The pad 40 is in the form of conventional rubberlike or felt yieldable material, and is held in a metal channel 42. The flexible resistance of the pad material opposes but does not normally overcome the frictional clamping hold exerted by screws 28 and 30. However, to provide a positive stop, and also a convenient way of automatically indicating when the blade has been shifted to its retracted position, it is desirable to have the back edge of the blade abut the heater element 26 when the blade reaches its position of desired small projection (FIG. 6). An alternate way of backing up the blade in its position of small projection is to shorten the lower ends of slots 36 until blade 16 abuts screws 28 and 30 while in its position of small projection.

When blade 16 is in its more extended position, as shown in FIGS. 3A-B and 7, screws 30 extend through the upper ends of slots 36 (FIG. 7), and only the frictional clamping force of heater bars 18 and 20 holds blade 16 in its intended position. However, when cutting with conventional blades of corresponding greater projection in such equipment, it is conventional to use a cutter pad having a slot which receives the blade without opposing its cutting edge. When blade 16 is extended;, it is accordingly used with a pad 44 having a slot 46 to receive blade 16. The greater projection of the blade cuts through the film in this case, without having to make contact with the pad. Frictional clamping takes care of holding blade 16 in place in that case, without any positive backup. When blade 16 is shifted to its more extended position, the movement stops when screws 30 abut the upper ends of slots 36, and that provides an automatic indication of when a shift of the blade to its more extended position has been accurately completed.

The amount of projection of blade 16 from heater bars 18 and 20 in its upper and lower positions is preferably conventional; for example, 0.013 to 0.016 inch in its upper position, and 0.06 to 0.07 inch in its lower position.

In accordance with conventional practice, when blade 16 and heater bars 18 and 20 are moved down to cut and seal film 10 extending across one of the pads 40 or 44, the clamping plates 22 and 24 move down with the blade and heater bars until they engage the film over the pad (FIGS. 2A and 3A). A series of springs 50 then yield to permit the clamping plates to push no further into the pad than necessary to hold the film against the action of the blade, while the blade and heater bars continue downward movement to cut through the film and seal it together on opposite sides of the cut (FIGS. 2B and 3B). On return movement, the blade and heater bars move up, bringing up clamping plates 22 and 24 with them after springs 50 return to their original extensions. Vibration insulating pads (not shown) preferably separate bar 54 from heater bars 18 and 20. Shoes 56 are slotted to receive the upper ends of heater bars 18 and 20. Pins 60 through the shoes and heater bars hold them together. Screws 62 hold clamping plates 22 and 24 to bar 54. Actuating means (not shown) for moving the whole assembly shown in FIG. 5 up and down are connected to the upper ends of shoulder screws 52.

While a present preferred embodiment and practice of the invention has been illustrated and described, it will be understood that the invention may be otherwise variously embodied and practiced within the scope of the following claims.

I claim:

1. Apparatus for repeatedly cutting and sealing an overlapping length of film, comprising a pair of elongated parallel heater bars adapted to be heated for fusing together adjacent layers of film, an elongated blade having an edge for cutting film, slots through the blade elongated transverse to its cutting edge, means extending between the heater bars through the slots, said means being operable to clamp the heater bars against the blade and releasable to permit the blade to be shifted between positions of longer and shorter projection of its cutting edge beyond the heater bars, a first cutting and sealing pad positioned opposite to the blade when the blade is in a position of shorter projection so that the blade cuts film where it rests on a surface of the first pad and a second cutting and sealing pad positioned opposite to the blade when the blade is in a position of longer projection, the second pad having a slot in position to receive the blade when the blade is in a position of longer projection.

2. Apparatus according to claim 1, in which the blade is adapted to abut said means at opposite ends of said slots when shifted to its said longer and shorter projection positions.

3. Apparatus according to claim 1, comprising the heating means between the hater bars which engages the blade when in its position of shortest projection.

4. A method of adjusting film cutting and sealing apparatus to provide different blade projections for articles of different sizes to be packaged in the film, comprising releasably clamping a cutting blade between heater bars with a clamping means in a first position on means for reciprocating the blade and bars together, the blade in said first position having a projection suitable for cutting and sealing film around relatively small articles, providing a first yieldable cutting and sealing pad opposite to the blade in said first position so that the blade cuts film where it rests on a surface of the first pad, releasably securing the blade in a second position on said means for reciprocating the blade, the blade in said second position having a longer projection suitable for cutting and sealing film around larger articles, removing the first pad from its position opposite to the blade, mounting a second cutting and sealing pad having a slot in position to receive the blade in its second position, and changing the projection of the blade from one of said positions to the other by releasing but not removing the blade from the clamping means that holds it in said positions.

5. Apparatus according to claim 4, in which the blade is clamped to the heater bars by means extending through slots in the blade, and the blade is released without removal by loosening said means and moving said means along slots in the blade.

* * * * *